United States Patent
Garmonov et al.

(10) Patent No.: US 8,154,446 B2
(45) Date of Patent: Apr. 10, 2012

(54) METHOD FOR ACQUIRING SIGNAL OF SATELLITE

(75) Inventors: Alexander Vasilievich Garmonov, Shevtsovoi (RU); Yury Nikolaevich Pribytkov, Khol'zunova (RU); Andrey Yurievich Savinkov, Moskovsky prospect (RU); Roman Vasilievich Titov, Moscovsky prospect (RU); Surinder Singh Thind, Staines (GB)

(73) Assignee: Samsung Electronics Co., Ltd (KR)

( * ) Notice: Subject to any disclaimer, the term of this patent is extended or adjusted under 35 U.S.C. 154(b) by 160 days.

(21) Appl. No.: 12/545,558

(22) Filed: Aug. 21, 2009

(65) Prior Publication Data

US 2010/0045526 A1    Feb. 25, 2010

(30) Foreign Application Priority Data

Aug. 21, 2008 (RU) ............................ 2008134164
Aug. 19, 2009 (KR) ...................... 10-2009-0076871

(51) Int. Cl.
G01S 19/24 (2010.01)
G01S 19/28 (2010.01)

(52) U.S. Cl. ........................ 342/357.63; 342/357.67

(58) Field of Classification Search ............ 342/357.31, 342/357.46, 357.63, 357.67, 357.71; 701/213, 701/215
See application file for complete search history.

(56) References Cited

U.S. PATENT DOCUMENTS

| | | | |
|---|---|---|---|
| 5,663,735 | A | 9/1997 | Eshenbach |
| 5,854,605 | A | 12/1998 | Gildea |
| 6,275,185 | B1 | 8/2001 | Loomis |
| 6,813,500 | B1 | 11/2004 | Ciganer et al. |
| 7,215,967 | B1 | 5/2007 | Kransmo et al. |
| 2007/0229351 | A1 | 10/2007 | Chen et al. |
| 2007/0229352 | A1 | 10/2007 | Chen et al. |

*Primary Examiner* — Dao Phan
(74) *Attorney, Agent, or Firm* — The Farrell Law Firm, P.C.

(57) ABSTRACT

Disclosed is a method for acquiring a signal of a satellite by a receiver, including pre-storing weighting factors of satellites, which include possibility indexes of satellite signal acquisition with respect to positions and times of the receiver, receiving a request for acquisition of the satellite and initializing operational status information and search history information of the satellites, searching for the satellites in sequence according to the weighting factors, resetting the operational status information and search history information of the satellites based on whether signals of the satellites are detected, updating the weighting factor of a satellite having a signal that has been detected, and selecting the satellite having the signal that has been detected in consideration of the updated weighting factor, and acquiring the signal from the selected satellite.

8 Claims, 5 Drawing Sheets

METHOD FOR ACQUIRING SIGNAL OF SATELLITE

PRIORITY

This application claims priority to an application entitled "Method of Fast Satellite Acquisition under Conditions of Complete A Priori Uncertainty" filed in the Russian Agency for Patents and Trademarks on Aug. 21, 2008 and assigned Serial No. RU 2008134164 and to an application filed in the Korean Industrial Property Office on Aug. 19, 2009, and assigned Serial No. 10-2009-0076871, the contents of both of which are incorporated herein by reference.

BACKGROUND OF THE INVENTION

1. Field of the Invention

The present invention relates generally to satellite communication, and more particularly to a method for acquiring a signal of a satellite.

2. Description of the Related Art

When a Global Positioning System (GPS) receiver is activated after being in the off position for a long time, it can take several minutes before the time to first fix is reached. There are a number of approaches which aim to reduce the time to first fix by means of different algorithms. Most current approaches rely on a priori data that should be obtained in advance, which causes the receiver to lose its independence. Examples of such methods are described in the following patents: U.S. Pat. No. 5,663,735 to Eshenbach, entitled "GPS receiver using a radio signal for improving time to first fix", and U.S. Pat. No. 5,854,605 to Gildea, entitled "GPS receiver having a fast time to first fix".

In these patents the time to first fix is reduced due to availability of time data obtained externally or by use of the receiver clock.

Other known methods calculate rough current satellite position using the previously known almanac or previous ephemeris values. An example of this approach is described in U.S. Pat. No. 6,275,185 to Loomis, entitled "GPS receiver using coarse orbital parameters for achieving a fast time to first fix".

Some of the prior art methods use the information about the approximate satellite position as well as other priori data, which quickens the system start time. Such methods are described in U.S. Pat. No. 7,215,967 to Kransmo et al, entitled "System and method for fast cold start of a GPS receiver in a telecommunications environment", and in U.S. Pat. No. 6,813,500 to Cinager et al, entitled "Cellular telephone using pseudolites for determining location".

U.S. Patent Publication No. 2007/0229351 to Chen et al. (hereinafter '351) discloses a cold start satellite search method. FIG. 1 illustrates a flowchart of the cold start satellite search method according to '351. Referring to FIG. 1, in step 101, a set of L satellites and weighting factors previously calculated for the satellites are pre-stored in a memory of a receiver. In step 111, a request signal for satellite signal acquisition is received, and the data stored in the receiver is initialized in step 112. That is, a determination on satellite searchability is initialized, an initial value is allocated to the weighting factors ($W_k$), and a candidate set for a satellite search is formed. In step 113, pursuant to a predefined rule, a satellite with the lowest number allocated thereto is selected from among the satellites set in the candidate set.

In step 114, a search is performed for a signal of the selected satellite. If a signal of the selected satellite is detected in step 115, then a determination is made in step 116 that the corresponding satellite has a searchable satellite signal, the weighting factor of the corresponding satellite is updated in step 117, and the corresponding satellite is removed from the candidate set in step 118. In step 119, it is determined whether a first satellite has been acquired The satellite search ends when the first satellite has been searched for, and the method proceeds to step 124 when the first satellite is not searched for. Contrarily, if a signal of the selected satellite is not detected in step 115, then in step 121 a determination that the corresponding satellite has an unsearchable satellite signal is made, the weighting factor of the corresponding satellite is updated in step 122, and the corresponding satellite is removed from the candidate set in step 123.

In step 124, it is determined whether there is any other satellite included in the candidate set. When no satellite remains in the candidate set, satellites having signals that are not searched for are reset to the candidate set in step 125. When any other satellite remains in the candidate set, in step 126 a satellite with the highest weighting factor is selected from among the satellites included in the candidate set in consideration of the weighting factors for the respective satellites, and then the method returns to step 114.

The above-described '351 publication cannot provide a fast Time-To-First-Fix (TTFF) under the conditions of a priori uncertainty. More specially, in the actual environment, a satellite may provide a signal to a receiver, but the receiver may not detect the signal provided from the satellite. Due to such an error in satellite signal detection, a weighting factor may be erroneous, which results in a problem of delaying a satellite signal search time. Also, there is another problem in that it may take a relatively long time to complete a satellite search because satellites having signals that are not searched for may be continuously returned to the candidate set. Further, the '351 publication has a problem in that it cannot perform searches actively against dynamic changes caused by errors of a satellite or an acquired satellite's movement below the horizon.

SUMMARY OF THE INVENTION

Accordingly, the present invention has been made to solve at least the above-mentioned problems occurring in the prior art, and the present invention provides a method for reducing the TTFF under the conditions of a priori uncertainty.

In accordance with the present invention, there is provided a method for acquiring a signal of a satellite by a receiver, the method including pre-storing weighting factors of satellites, which include possibility indexes of satellite signal acquisition with respect to positions and times of the receiver, receiving a request for acquisition of the satellite, and initializing operational status information and search history information of the satellites, searching for the satellites in sequence according to the weighting factors, resetting the operational status information and search history information of the satellites based on whether signals of the satellites are detected, updating the weighting factor of a satellite having a signal that has been detected, and selecting, in consideration of the updated weighting factor, the satellite having a signal that has been detected, and acquiring the signal from the selected satellite.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EMBODIMENTS

Figure 1:
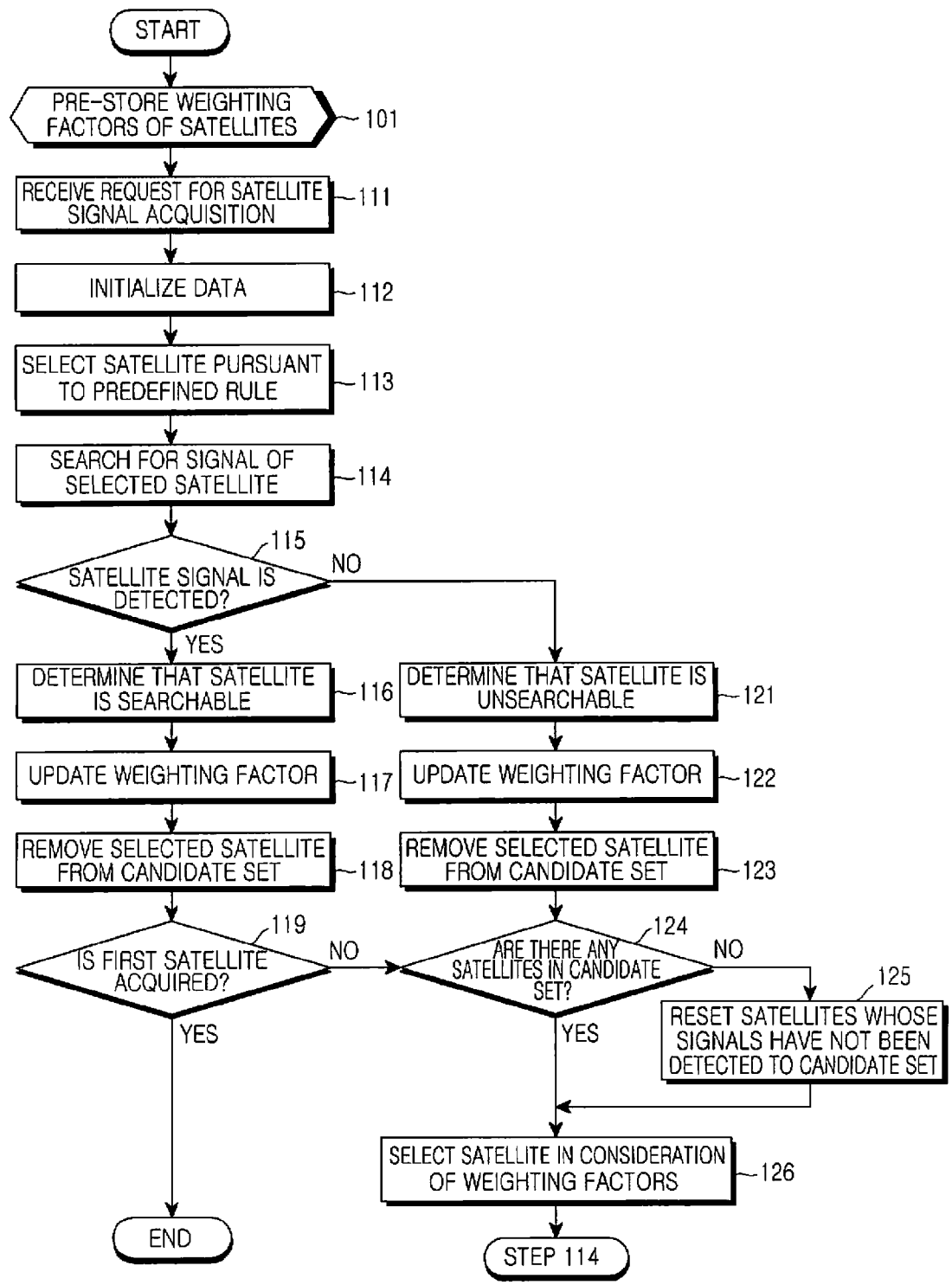
FIG. 1 illustrates a conventional satellite signal acquisition method.

Embodiments of the present invention are described in detail with reference to the accompanying drawings. It should be noted that the same or similar components are designated by the same or similar reference numerals although they are illustrated in different drawings. Detailed descriptions of constructions or processes known in the art may be omitted for the sake of clarity and conciseness.

In embodiments of the present invention, "operational status information of a satellite" includes candidate set, active set, and passive set as information for identifying operational status of the satellite. Also, "search history information of the satellite" includes vacant state, scanned state and unscanned state as information for identifying search history information of the satellite.

FIGS. 2 to 5 illustrate a satellite signal acquisition method according to the present invention.

Figure 2:
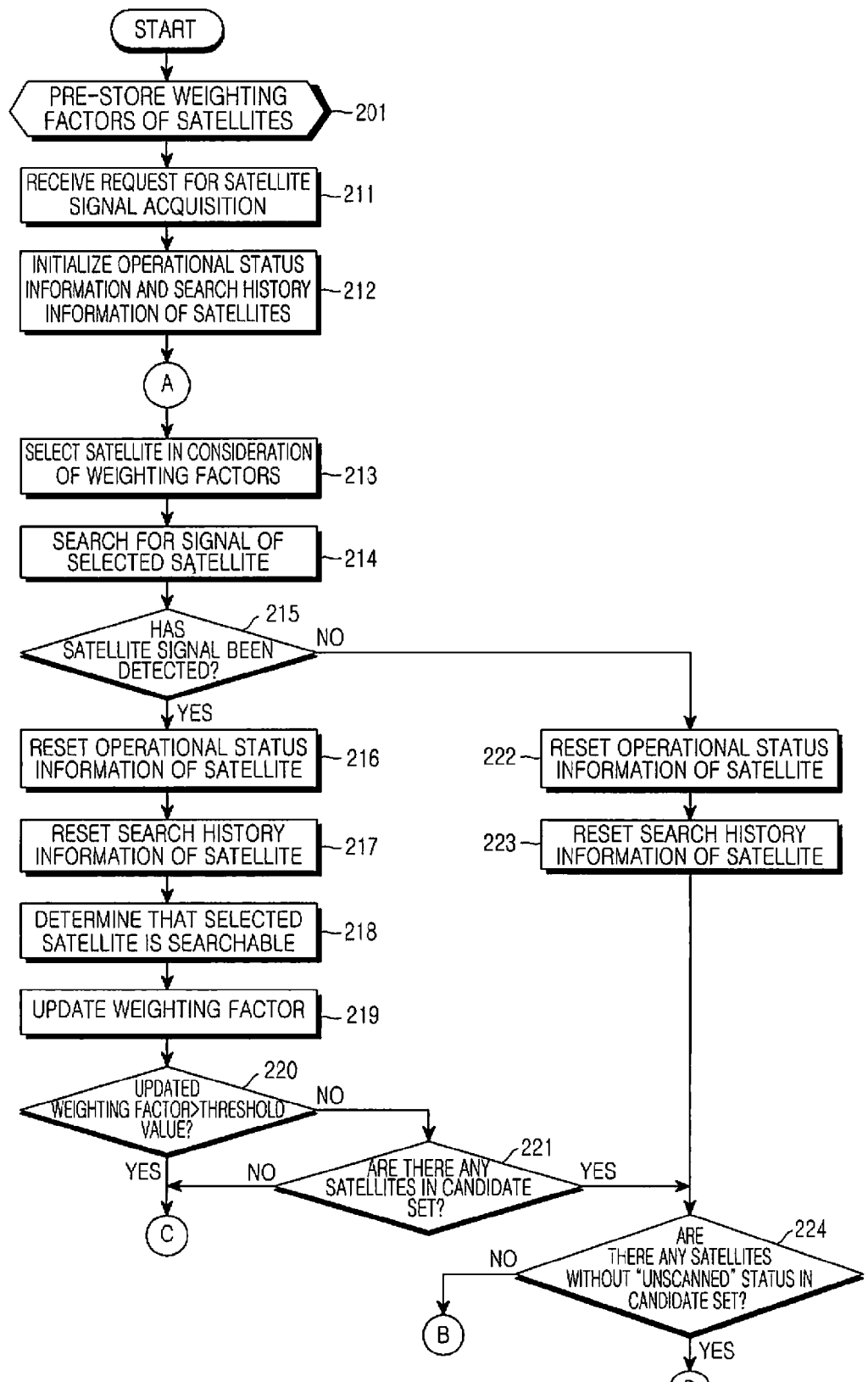
FIG. 2 illustrates steps 201 to 224 of a satellite signal acquisition method according to the present invention.

Referring first to FIG. 2, in step 201, a receiver pre-stores information on a set of L satellites and as many numbers as Q parameter sets, allocated to the respective satellite.

The use of each of the following parameter sets requires more computational resources but allows weaker signals acquisition. These conditional probabilities are pre-calculated, assuming that all possible user coordinates ($\phi_0, \theta_0$) and receiver switch-on times t have the assigned combined distribution function $f(t, \phi_0, \theta_0)$, or assuming that they are equiprobable. To obtain $P(i|k_1 \ldots k_n)$ the function $X(i, \phi_0, \theta_0, t)$ equal to 1 is pre-formed, if the satellite with ID=i at time t is visible to the receiver located at a point on the Earth's surface having angular coordinates ($\phi_0, \theta_0$), and equal to zero otherwise. Then probabilities $P(i|k_1 \ldots k_n)$ are given by Equation (1):

$$P(i|k_1 \ldots k_n) = \frac{\int_0^{2\pi} \int_{-\pi/2}^{\pi/2} \int_0^T f(t, \varphi_0, \theta_0) \cdot X(i, t, \varphi_0, \theta_0) \cdot \prod_{j=1}^n X(k_j, t, \varphi_0, \theta_0) dt d\theta_0 d\varphi_0}{\int_0^{2\pi} \int_{-\pi/2}^{\pi/2} \int_0^T f(t, \varphi_0, \theta_0) \cdot \prod_{j=1}^N X(k_j, t, \varphi_0, \theta_0) dt d\theta_0 d\varphi_0}$$

In step 211, the receiver receives a request signal for satellite signal acquisition, and initializes the operational status information and search history information of the satellites in step 212. More specially, the operational status information of the satellites are all set to a candidate set such that no satellite is included in the active and passive sets. Also, the search history information of the satellites are initialized to a vacant state such that they are not set to a scanned or unscanned state. In step 212, a counter value q for determining the number of times of searching for satellites is further initialized (q=1).

In step 213, the receiver selects a satellite having a signal to be searched for in consideration of the weighting factors pre-stored in the memory. For example, a satellite having a signal to be searched for may be selected from among the satellites set in the candidate set, in order from the highest to the lowest weighting factor. When the weighting factors of the satellites set in the candidate set are all the same, a satellite that has the lowest number among the numbers allocated to the respective satellites may be selected.

In step 214, the receiver searches for a signal of the satellite selected in the previous step. In step 215, the method proceeds to step 216 when a signal of the corresponding satellite is detected, and proceeds to step 222 when a signal of the corresponding satellite is not detected.

The receiver resets the operational status information of the selected satellite by moving it from the candidate set to the active set in step 216, and resets the search history information of the selected satellite from the vacant state to the scanned state in step 217. Also, the receiver makes a determination that the selected satellite is searchable in step 218, reflects a value corresponding to the "searchable" determination in the weighting factor of the selected satellite among the pre-stored weighting factors to recalculate the weighting factor, and then updates and stores the recalculated weighting factor in step 219. Next, in step 220, the receiver compares the updated weighting factor with a threshold value to determine whether the updated weighting factor has a value greater than the threshold value.

The method proceeds to step 241 (see FIG. 4) when the updated weighting factor has a value greater than the threshold, and proceeds to step 221 when the updated weighting factor does not have a value greater than the threshold. In step 221, the receiver determines whether there is any satellite other than the selected satellite in the candidate set. The method proceeds to step 241 (see FIG. 4) when no satellites remain in the candidate set, and proceeds to step 224 when other satellites remain in the candidate set.

When a signal of the selected satellite is not detected in step 215, the receiver resets the operational status information of the selected satellite by moving it from the candidate set to the passive set in step 222, maintains the search history information of the selected satellite in the scanned state, and does not separately update the weighting factor of the selected satellite in step 223.

The method then proceeds to step 224, where it is determined whether there are any other satellites that are not set to the "unscanned" state in the candidate set. The method proceeds to step 251 (see FIG. 5) when there are other satellites that are not set to the "unscanned" state in the candidate set and proceeds to step 231 (see FIG. 3) when there are no satellites that are not set to the "unscanned" state in the candidate set.

Figure 3:
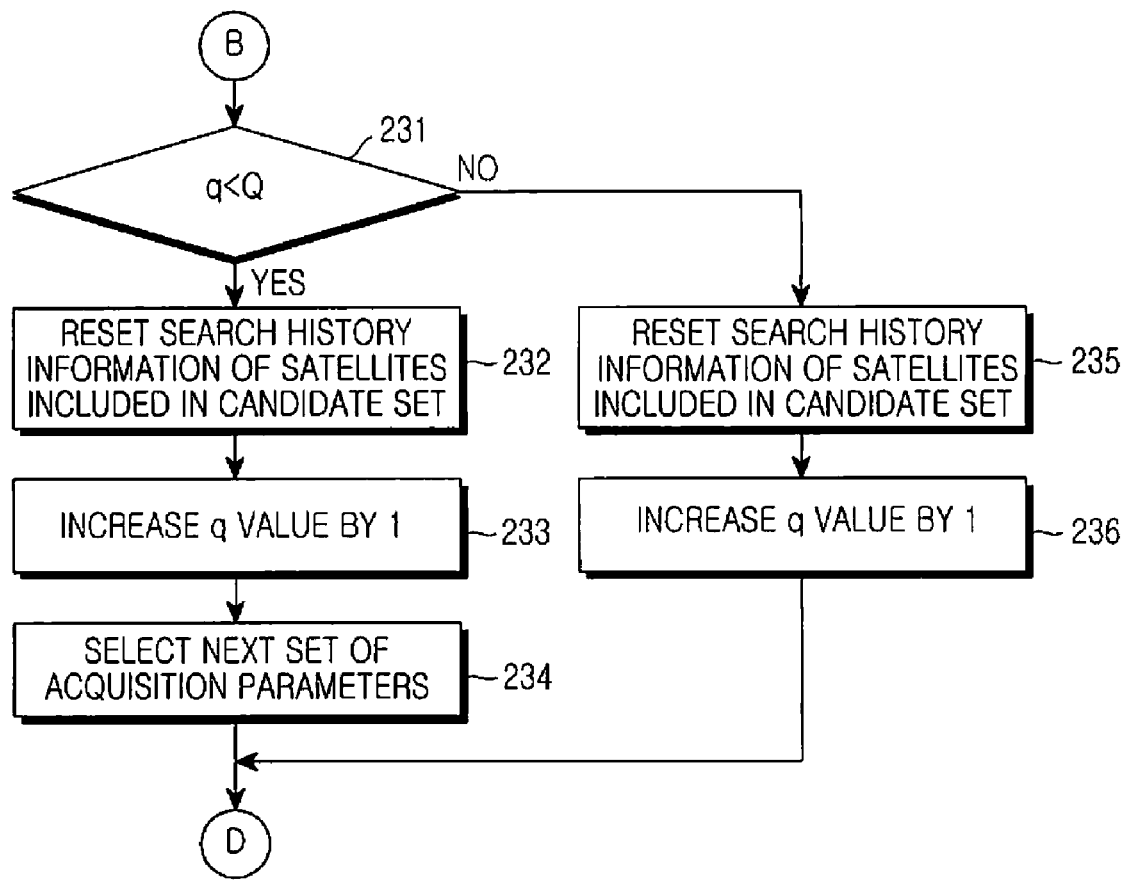
FIG. 3 illustrates steps 231 to 236 of the satellite signal acquisition method according to the present invention.

Referring to FIG. 3, in step 231, the receiver determines whether the counter value q is less than the total number Q of satellites. The method proceeds to step 232 when the counter value q is equal to or less than the total number Q of satellites. In step 232, the receiver initializes the search history information by resetting the search history information of the satellites that are set to the "scanned" state among the satellites set in the candidate set. The receiver increases the counter value by 1 in step 233, selects the next acquisition parameter set in step 234, and then proceeds to step 251 (see FIG. 5). Contrarily, when the counter value q is greater than the total number Q of satellites, the receiver initializes the search history information by resetting the search history information of the satellites that are set to the "scanned" state among the satellites set in the candidate set in step 235, increases the counter value by 1 in step 236, and then proceeds to step 251 (see FIG. 5).

Figure 4:
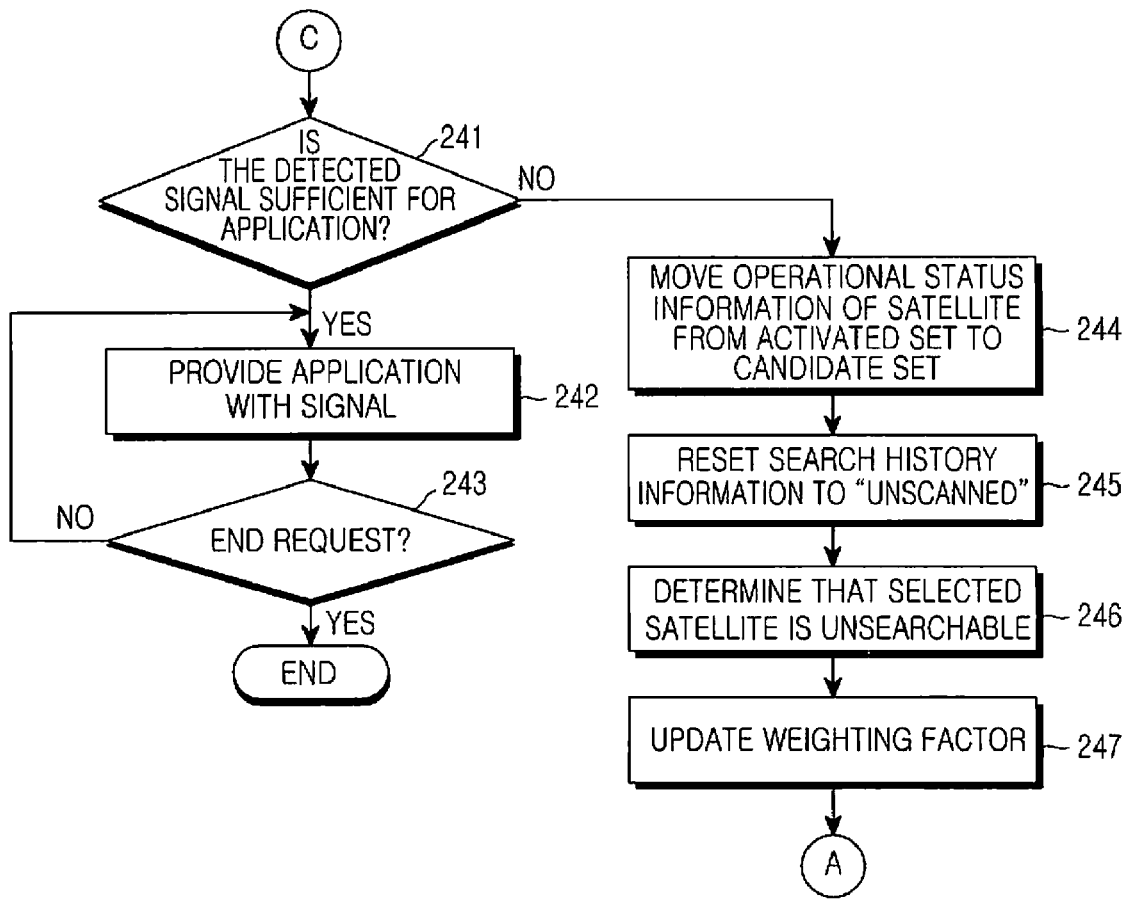
FIG. 4 illustrates steps 241 to 247 of the satellite signal acquisition method according to the present invention.

With reference to FIG. 4, in step 241, the receiver determines whether the detected signal is of sufficient quality to satisfy an application. For example, the receiver determines whether the detected signal has a sufficient signal strength for compliance with the level required by an application, such as for driving a navigation apparatus. When the detected signal strength is thus sufficient, the receiver provides the application with the signal of the selected satellite while sequentially proceeding to steps 242 and 243. When the detected signal is insufficient to satisfy the quality required by the application, the receiver moves the operational status information of the selected satellite from the active set to the candidate set in step 244, and resets the search history information of the selected satellite to the "unscanned" state in step 245. Also, the receiver cancels the determination in step 218 that the selected satellite is searchable, and determines that the selected satellite is unsearchable in step 246. Further, the receiver reflects a value corresponding to the "unsearchable" determination in the weighting factor of the selected satellite to recalculate the weighting factor, and updates and stores the recalculated weighting factor in step 247.

Figure 5:
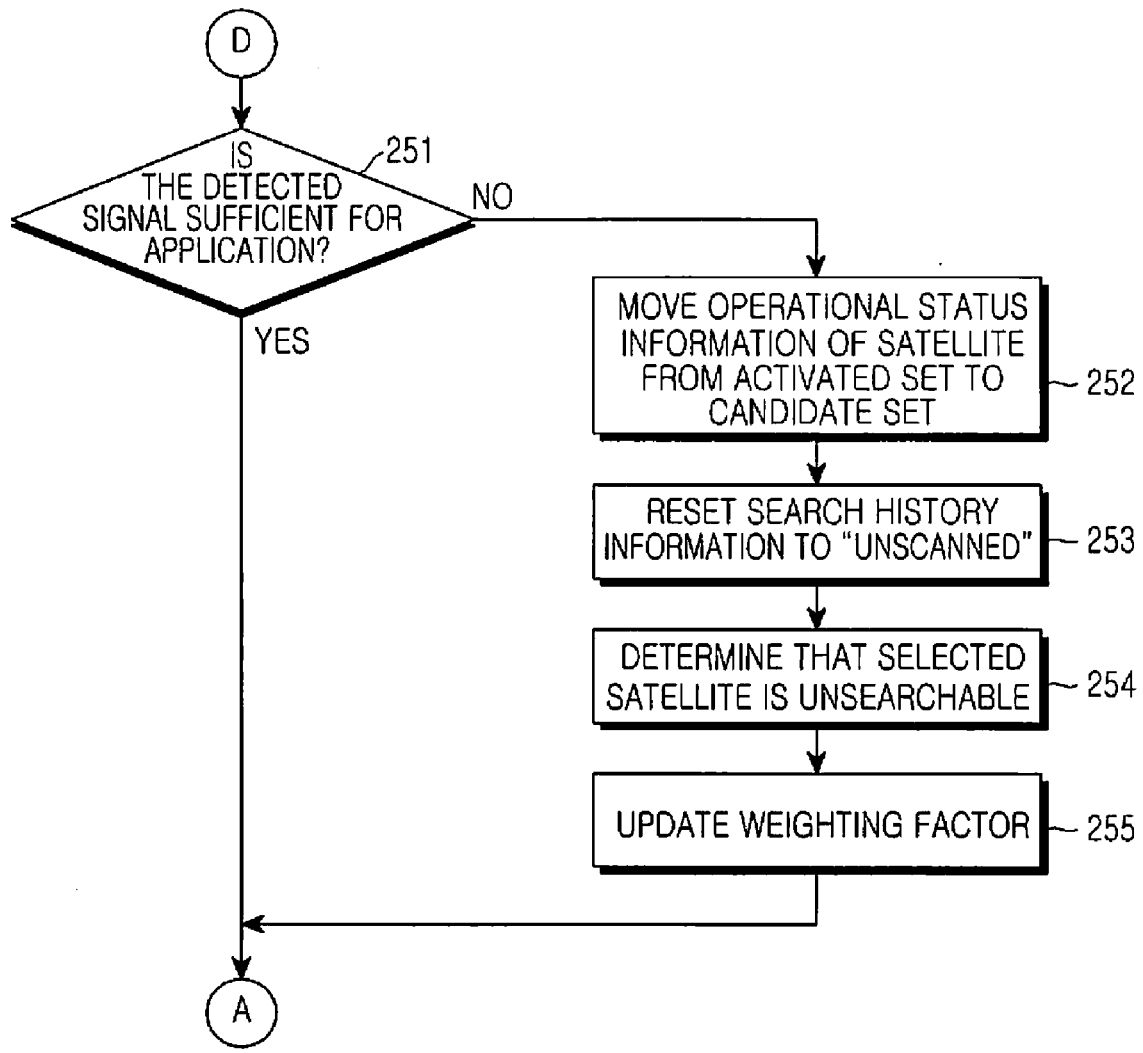
FIG. 5 illustrates steps 251 to 255 of the satellite signal acquisition method according to the present invention.

With reference to FIG. 5, in step 251, the receiver determines whether the detected signal is of sufficient quality to satisfy an application. For example, the receiver determines whether the detected signal has sufficient signal strength for compliance with the level required by an application, such as for driving a navigation apparatus. When the detected signal is thus sufficient, the method returns to step 213. When the detected signal is insufficient to satisfy the quality required by the application, the receiver moves the operational status information of the selected satellite from the active set to the candidate set in step 252, and resets the search history information of the selected satellite to the "unscanned" state in step 253. Also, the receiver cancels the determination in step 218 that the selected satellite is searchable, and determines that the selected satellite is unsearchable in step 254. Further, the receiver reflects a value corresponding to the "unsearchable" determination in the weighting factor of the selected satellite to recalculate the weighting factor, and updates and stores the recalculated weighting factor in step 255. Thereafter, the method returns to step 213.

The present invention is implemented by the known hardware, namely NAVigation Satellite Time And Range (NAVSTAR), Global Navigation Satellite System (GLONASS) and GALILEO satellite navigation systems, which are a navigation signal source and navigation signal receiving and processing devices mounted on mobile and stationary objects.

The present invention provides a number of advantages over the prior art. For example, active and passive satellite sets are additionally formed which enables fast logic distribution of satellites having signals that are detected into the active set, the satellites having signals that should be searched for form a part of the candidate set, and the satellites having signals that are unlikely to be detected due to their detection probability being below the specified threshold, are included into the passive set. The rule followed to logically distribute the satellites between the sets allows tracking of satellite signals in real conditions.

As another advantage of the present invention, the search is carried out in S steps, which allows a fast acquisition of strong signals at the initial step and the signals of the remaining weaker satellites are acquired at subsequent steps. This also reduces satellite signal searching time.

Moreover, current weighting factors are updated at each searching stage only according to true decisions made with regard to satellite position change. Therefore, an unsuccessful search due to weak satellite signal, such as in an urban location, does not result in a weighting factors calculation error.

It is obvious that a method according to the present invention can be realized by hardware, software (i.e., a program), or a combination thereof. This program can be stored in a volatile or nonvolatile recording medium readable by a machine such as a computer. This medium can be a storage device such as a Read-Only Memory (ROM), a memory such as a Random-Access Memory (RAM), a memory chip, or an integrated circuit, or an optical or magnetic recording medium such as a Compact Disk (CD), a Digital Versatile Disk (DVD), a magnetic disk, or a magnetic tape.

While the present invention has been shown and described with reference to an embodiment thereof, it will be understood by those skilled in the art that various changes in form and detail may be made therein without departing from the spirit and scope of the invention as defined by the appended claims.

What is claimed is:

1. A method for acquiring a signal of a satellite by a receiver, the method comprising the steps of:
    pre-storing weighting factors of satellites, the weighting factors including probabilities of satellite signal acquisition with respect to positions of the receiver and times of the receiver;
    receiving a request for acquisition of the satellite, and initializing operational status information of the satellites to a candidate set and search history information of the satellites to a vacant state;
    searching for the satellites in sequence from the candidate set according to the weighting factors;
    resetting the operational status information and search history information of the satellites based at least on whether signals of the satellites are detected;
    updating the weighting factor of a satellite in accordance with at least one of signal detection and signal sufficiency for an application of the receiver; and
    selecting, in consideration of the updated weighting factor, a satellite having a detected signal that is sufficient for an application of the receiver, and acquiring the signal from the selected satellite.

2. The method as claimed in claim 1, wherein the weighting factors are obtained by estimating a distribution of the satellites according to position coordinates of the receiver and switch-on times of the receiver, and using results of the estimating to confirm probability values of satellite signal acquisition with respect to the receiver.

3. The method as claimed in claim 1, wherein, in searching for the satellites, the satellites are searched for in descending order from highest weighting factor to lowest weighting factor.

4. The method as claimed in claim 1, wherein, resetting the operational status information and search history information of the satellites comprises:
    moving the operational status information of the satellite having the signal that has been detected from the candidate set to an active set, resetting the search history information of the satellite to a scanned state, and updating the weight factor of the satellite; and
    maintaining the operational status information of a satellite having a signal that has not been detected in the candidate set, resetting the search history information of the satellite to the scanned state, and refraining from updating the weighting factor of the satellite.

5. The method as claimed in claim 4, further comprising the steps of:

comparing the updated weighting factor of the satellite having the signal that has been detected with a threshold value; and when the updated weighting factor of the satellite having the signal that has been detected is greater than or equal to the threshold value, maintaining the operational status information of the satellite having the signal that has been detected in the active state.

6. The method as claimed in claim 5, further comprising setting the operational status information of the satellite having the signal that has not been detected to a passive set.

7. The method as claimed in claim 1, further comprising resetting the operational status information of the satellite having the signal that has been detected to the candidate set, when the signal received from the satellite having the signal that has been detected is of an insufficient quality to be applied to an application of the receiver.

8. The method as claimed in claim 7, further comprising resetting the search history information of the satellite having the signal that has been detected to an unscanned state.

* * * * *